(12) United States Patent
Grauch

(10) Patent No.: US 11,496,579 B2
(45) Date of Patent: Nov. 8, 2022

(54) CONNECTION MANAGER

(71) Applicant: Comcast Cable Communications, LLC, Philadelphia, PA (US)

(72) Inventor: Edward Grauch, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 481 days.

(21) Appl. No.: 15/001,033

(22) Filed: Jan. 19, 2016

(65) Prior Publication Data

US 2017/0208134 A1    Jul. 20, 2017

(51) Int. Cl.

| | |
|---|---|
| *H04L 67/145* | (2022.01) |
| *H04L 67/141* | (2022.01) |
| *H04L 43/08* | (2022.01) |
| *H04L 41/0681* | (2022.01) |
| *H04L 43/10* | (2022.01) |

(52) U.S. Cl.
CPC ........ *H04L 67/145* (2013.01); *H04L 41/0681* (2013.01); *H04L 43/08* (2013.01); *H04L 43/10* (2013.01); *H04L 67/141* (2013.01)

(58) Field of Classification Search
CPC ... H04L 67/145; H04L 41/0681; H04L 43/08; H04L 43/10; H04L 67/141
USPC ........................................................ 709/204
See application file for complete search history.

(56) References Cited

U.S. PATENT DOCUMENTS

| | | | |
|---|---|---|---|
| 8,856,354 B1* | 10/2014 | Mukerji ................. | H04L 47/10 709/223 |
| 9,282,495 B1* | 3/2016 | McKeeman .......... | H04W 36/32 |
| 9,848,058 B2* | 12/2017 | Johnson ................ | G16H 40/20 |
| 2004/0044887 A1* | 3/2004 | Park ...................... | H04W 36/30 713/1 |
| 2007/0019670 A1* | 1/2007 | Falardeau ............. | H04W 48/18 370/465 |
| 2007/0113275 A1* | 5/2007 | Khanna ................ | H04L 12/4641 726/15 |
| 2007/0223408 A1* | 9/2007 | Thielke ................. | H04W 48/18 370/310 |
| 2008/0059582 A1* | 3/2008 | Hartikainen .......... | H04L 67/145 709/204 |
| 2008/0225865 A1* | 9/2008 | Herzog ............. | H04W 52/0229 370/401 |

(Continued)

*Primary Examiner* — Hee Soo Kim
*Assistant Examiner* — Chong G Kim
(74) *Attorney, Agent, or Firm* — Banner & Witcoff, Ltd.

(57) ABSTRACT

Systems and methods are described for monitoring, maintaining, and selecting one or more network connections. One or more network connections may be selected based on preferences. A connection manager may create a consistent access point for connecting devices. The connection manager may manage transmissions between the devices and the one or more network connections, such that the devices maintain consistent connectivity. The connection manager may detect erratic behavior in one or more of the connections, and may take action to enhance performance, consistency, and quality of the connection. The connection manager may respond to heartbeat or keep-alive type requests on behalf of a temporarily unavailable network connection, thereby maintaining a data state or preventing data loss by the connected device. The connection manager may also provide for secure VPN tunnels over the one or more networks.

21 Claims, 10 Drawing Sheets

(56) References Cited

U.S. PATENT DOCUMENTS

| | | | |
|---|---|---|---|
| 2008/0239961 A1* | 10/2008 | Hilerio | H04L 41/5009 370/235 |
| 2009/0124284 A1* | 5/2009 | Scherzer | H04M 1/72561 455/552.1 |
| 2009/0210485 A1* | 8/2009 | Dunk | H04L 67/14 709/203 |
| 2010/0281118 A1* | 11/2010 | Donahue | H04L 67/14 709/206 |
| 2010/0325306 A1* | 12/2010 | Vimpari | H04L 29/12471 709/233 |
| 2010/0332212 A1* | 12/2010 | Finkelman | G06F 1/3203 703/23 |
| 2011/0235624 A1* | 9/2011 | Scott | H04W 48/18 370/338 |
| 2011/0264800 A1* | 10/2011 | Allred | H04L 29/125 709/224 |
| 2011/0286373 A1* | 11/2011 | Herzog | H04W 76/25 370/310 |
| 2012/0158920 A1* | 6/2012 | Yang | G06F 8/61 709/220 |
| 2012/0226767 A1* | 9/2012 | Luna | H04L 65/4092 709/216 |
| 2013/0007299 A1* | 1/2013 | German | H04L 67/26 709/237 |
| 2013/0244636 A1* | 9/2013 | Shukla | H04W 4/00 455/418 |
| 2014/0056313 A1* | 2/2014 | Wada | H04L 63/02 370/463 |
| 2014/0078968 A1* | 3/2014 | Korhonen | H04W 52/0229 370/328 |
| 2014/0185519 A1* | 7/2014 | Zhang | H04W 40/248 370/328 |
| 2014/0328187 A1* | 11/2014 | Rantanen | H04W 24/02 370/242 |
| 2015/0215832 A1* | 7/2015 | Fitzpatrick | H04W 48/18 455/426.1 |
| 2015/0244774 A1* | 8/2015 | Jang | H04L 67/141 709/203 |
| 2016/0150451 A1* | 5/2016 | Barreto De Miranda Sargento | H04W 36/14 370/332 |
| 2017/0279922 A1* | 9/2017 | Sharma | H04L 67/1097 |

* cited by examiner

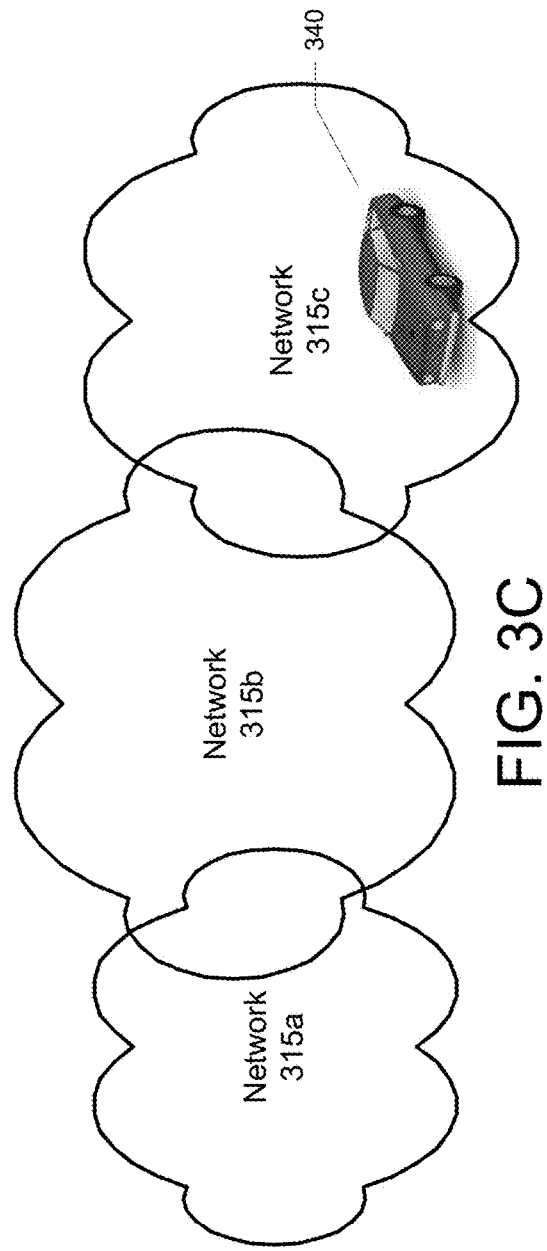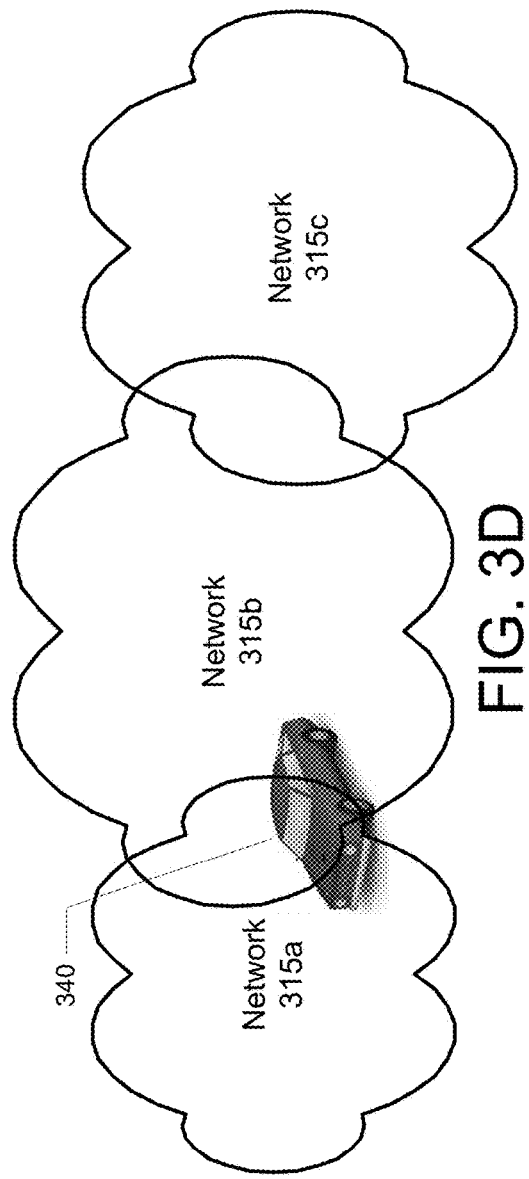

CONNECTION MANAGER

BACKGROUND

As more and more content such as applications, service offerings, and games depends upon a good, strong, continuous service connection between user devices and a cloud or other type of network device, there will be a greater dependency on the connecting architecture. This dependency presents a need for a quality connection between the devices for implementations of the services and applications. Further, there will always be a need to improve connectivity between a device and a cloud, a server, and/or an application.

SUMMARY

The following summary is for illustrative purposes only and is not intended to limit or constrain the detailed description. The following summary merely presents some of the various aspects in a simplified form as a prelude to the more detailed description provided below.

Aspects of the disclosure relate to systems, methods, apparatuses and computer-readable media for a connection manager. In some aspects, a method may include establishing a connection to a device and a wireless network by a connection manager. The connection manager may receive a request for detecting a status of the connection between the connection manager and the wireless network. The connection manager may determine, for example, that the status of the connection to the wireless network is experiencing erratic behavior, and send a "keep-alive" type message responsive to the request.

A connection manager (e.g., a Roving Internet Connection Manager (RICM)) may include hardware, software, or a combination thereof that may monitor and/or maintain one or more network connections, and may create a consistent access point (using e.g., Wi-Fi, BLUETOOTH, etc.) for connecting one or more devices. The one or more connections may be prioritized based on one or more preferences (e.g., of a client, user, customer, or the like). The connection manager may be used for any application, and may especially improve performance for an application or service that is primarily dependent on a cloud or server connection.

The connection manager may store and/or implement preferences. For example, the connection manager may prioritize, adjust, or use one or more connections or transmissions based on connection cost, technology preference (e.g., Wi-Fi, BLUETOOTH, 3G network, 4G network, Ethernet, etc.), connection speed, a preferred provider, security, protocol, or the like. For example, connection cost may vary based on bandwidth, amounts of data, or other limits. For example, cost limits may be applicable to a particular connection type, speed, and amount of data over a period of time (e.g., a 3G network may be limited to 50 kbits/second with a monthly cap of 20 Mbytes/month, or a 4G network may be limited to 200 kbits/second and 500 Mbytes/month). Further, decisions based on connection and/or technology preferences may be performed by the connection manager in order to manage the decisions independently from any connected device, such as a laptop, tablet, mobile phone, car radio, navigation system, or any device that may be executing a data-using application.

In some aspects, the connection manager may be a mobile or stationary computing device. The mobile or stationary device may include capabilities similar to a mobile wireless router, a wireless hotspot, or the like.

In some examples, the connection manager may act as a Wi-Fi range extender and/or aggregator that may create a consistent service set identifier (SSID) hotspot. For example, when the connection manager is in range of a public or private hotspot, the connection manager may connect to the hotspot, then broadcast a signal that provides a connection to the hotspot. In other words, the connection manager may act as a range extender for the hotspot. As another example, when the connection manager is located outside of a Wi-Fi hotspot area, or a connection other than a hotspot connection is available, the connection manager may connect to a LTE network, 3G network, 4G network, BLUETOOTH, or other network, and provide a consistent connection to one or more of those networks by acting, for example, as a Wi-Fi or BLUETOOTH access point.

Further, the connection manager may manage one or more attributes or preferences, such as the connection speed or usage, as mentioned above. In some aspects, the connection manager may act as an intermediator and/or manage a connection between a device (e.g., a consumption device, an end-user device, a smartphone, a tablet, a laptop, etc.) and a server, cloud, and/or network. In some examples, the connection manager may determine the ideal connection for a device to connect to the cloud (e.g., via 3G network, 4G network, LTE network, Wi-Fi, or any other wireless connection capability). As another example, the connection manager may determine the ideal connection based on parameters set by a network device, service provider, and/or end user. In some instances, the connection manager may use a connection-priority system based on the user device being connected using a connection associated with the lowest cost or cheapest type of connection. In other instances, the priority system may be based on the user device using a connection associated with the highest or strongest bandwidth. As another example, there may be a specialized package or combination of factors that may determine how the connection manager connects the device (e.g., user device) to a network (e.g., based on a combination of bandwidth and cost).

In some aspects, the connection manager may dynamically adjust or readjust the connection between a device and one or more networks. In some embodiments, the connection manager may connect to one or more new or different networks based on the location of the device. In some examples, the connection manager may use different modulation schemes based on different geographic endpoints of the device, and may open and keep open multiple connections as the device moves through different geographic locations. The connection manager may open new connections as they become available. The connection manager may drop connections that have poor connection quality, that cannot be opened or connected to, or that cannot be maintained.

In some embodiments, the connection manager may execute deep packet inspection and may hold details of the source of the routes and sockets for one or more connections (e.g., between the device and the network) in order to understand what the connection manager or a device is connected to, and the status of that connection at any given moment in time. The packets may be, for example, Transmission Control Protocol (TCP) packets or Hypertext Transfer Protocol (HTTP) packets. In some aspects, when noise or delay occurs in the connection, the connection manager may perform proxy behavior on behalf of the cloud or network and keep the local connection between the connection manager and the device alive. In some embodiments, the connection manager may respond to a heartbeat connection request, and may mimic or resemble a server or device on the cloud at an interval of time (e.g., at least every four seconds) in order to prevent a bad connection from disrupting application behavior, causing an application to fail, lose data, or have some other problem related to the connection. In some aspects, the connection manager may help maintain a high-quality connection at the TCP level or media access control (MAC) level. In some embodiments, the connection manager may maintain or allow for one or more virtual private network (VPN) tunnels between one or more connected devices and a network location.

In some instances, the connection manager may identify erratic behavior (e.g., poor connection quality) in a connection (e.g., between the cloud and the device). The connection manager may mimic, or otherwise simulate, one or more functions of the cloud once the erratic behavior has been identified, and may stop mimicking the one or more functions of the cloud after the erratic behavior has ended. In some embodiments, to mimic the one or more functions of the cloud, the connection manager may store or buffer packets, or buffer already-extracted packets. For example, if erratic behavior is identified, these buffered packets or stored extracted packets may be used to mimic the application device and/or cloud by sending the buffered packets or stored packets between the connection manager and the device. In some examples, the packets may be TCP packets. A group of TCP packets together may form a HTTP keep-alive message. A keep-alive message may be used by the connection manager in order to keep alive a quality or high-quality connection between the device and the cloud. The keep-alive message may identify itself as coming from a source that may be the internet protocol (IP) address that the device is expecting to see packets from, or the socket the device is expecting to see packets from.

In some aspects, the connection manager may be implemented as standalone hardware (e.g., an adapter, a hotspot, a jetpack, etc.). In other aspects, the connection manager may be part of a hub device or a computing device (e.g., a router, a gateway, a set-top box, a modem, an access point, etc.). In some instances, the connection manager may be integrated into a user device (e.g., a cell phone, laptop, personal digital assistant (PDA), mobile computing device, pager, or any end-user device). In some examples, the connection manager may sit or act as middleware, or may be located in the communication stack. In other examples, the connection manager may be located in a cloud, network, or application device.

This summary is not intended to identify critical or essential features of the disclosure herein, but instead to merely summarize certain features and variations thereof. The summary here is not an exhaustive listing of the novel features described herein and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 3C and 3D depict an example operating network in accordance with aspects of the present disclosure.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof are meant to encompass the items listed thereafter and equivalents thereof, as well as additional items and equivalents thereof.

One or more embodiments of the present disclosure provide mechanisms that may manage the connection between a device (e.g., a consumption device) and a network (e.g., a cloud, wide-area network, local area network, content server, application device, or the like). Some aspects discussed herein may include a method, system, apparatus, device, or processor executing computer-readable instructions. A connection manager may monitor and/or maintain one or more connections and create a consistent access point for one or more devices to connect to. The connection manager may manage wired or wireless connections, which may include a wide area network, local area network, 3G network, 4G network, LTE network, or any other platform that may be used to connect devices and/or networks. Other aspects described herein may describe a method for identifying erratic behavior of a connection between a device (e.g., user device, mobile device, etc.) and a wireless network (e.g., server, cloud, etc.). The method may include implementing a connection manager to mimic the wireless network to maintain the connection between the device and the wireless network. Some aspects described herein may describe a method for maintaining, opening, terminating, and accessing a new wireless network or network connection for a device, in response to the device changing geographic locations.

As stated above, certain embodiments are discussed herein that relate to managing a prioritized list of potential internet connections based on a user's preference and/or creating a consistent Wi-Fi or BLUETOOTH based access point for devices to connect to, e.g., while the user is in transit. Before discussing these concepts in greater detail, several examples of computing devices and system architectures that may be used in implementing or otherwise providing the various aspects of the disclosure will first be discussed with respect to FIG. 1 and FIG. 2.

Figure 1:
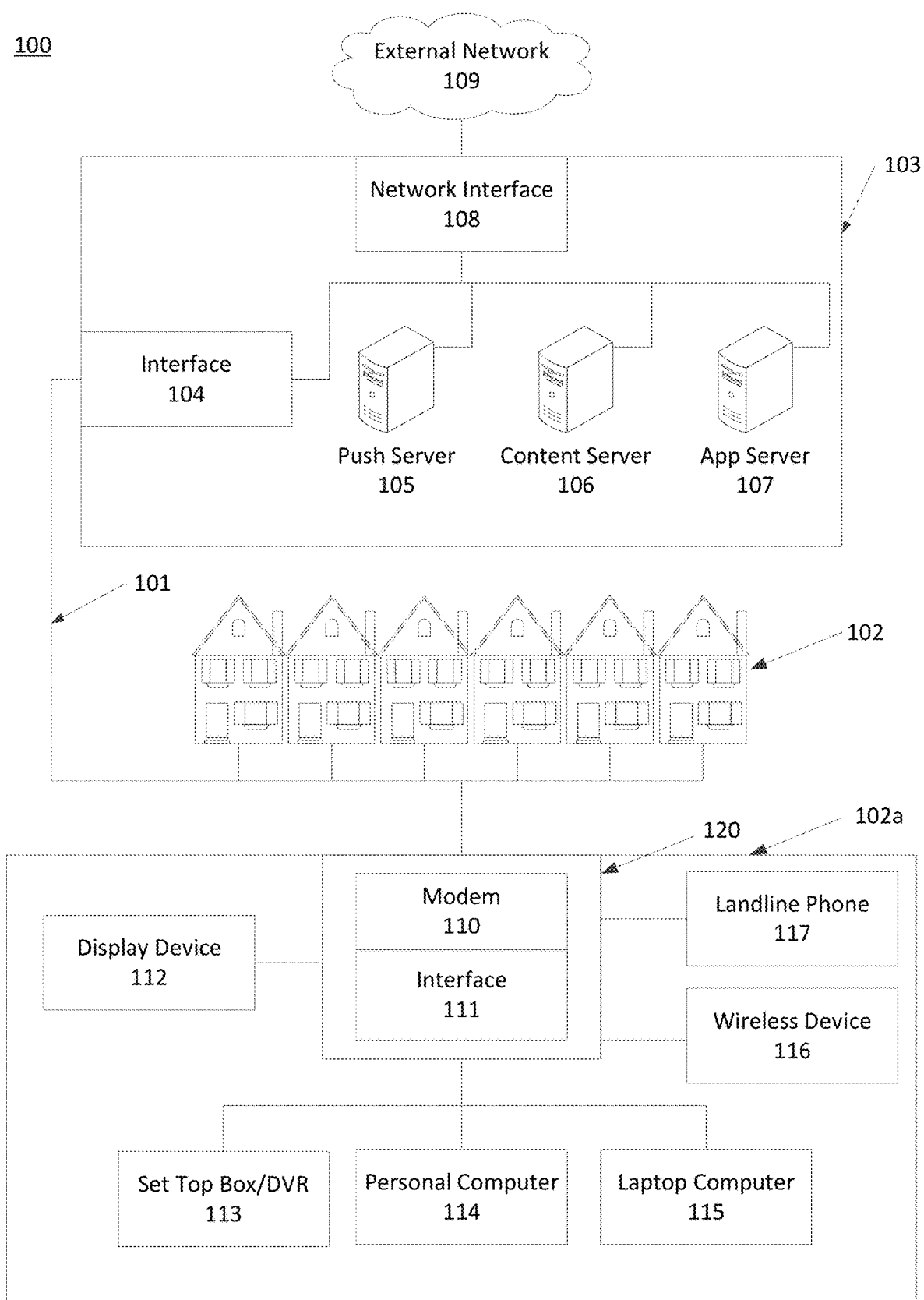
FIG. 1 depicts an example operating network in accordance with aspects of the present disclosure.

FIG. 1 illustrates an example communication network 100 in which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect various premises 102 (e.g., businesses, homes, consumer dwellings, etc.) to a local office or head-end 103. The local office 103 may transmit downstream information signals onto the links 101, and each premises 102 may have a receiver used to receive and process those signals.

There may be one link 101 originating from the local office 103, and link 101 may be split a number of times to distribute the signal to various premises 102 in the vicinity (which may be many miles) of the local office 103. The links 101 may include components not illustrated, such as splitters, filters, amplifiers, etc. to help convey the signal clearly, but, in general, each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface 104, such as a termination system (TS). More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or the interface 104 may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) or device(s).

The local office 103 may also include one or more application devices 107. An application device 107 may be one or more computing devices configured to offer any desired service, and may run various languages and operating systems (e.g., servlets and JSP pages running on TOMCAT/MYSQL, OSX, BSD, UBUNTU, REDHAT, HTML5, JAVASCRIPT, AJAX AND COMET). For example, an application device may be responsible for collecting television program listings information and generating a data download for electronic program guide listings. An application device may be responsible for monitoring user viewing habits and collecting that information for use in selecting advertisements. An application device may be responsible for receiving and transmitting communications related to a security system in accordance with the present disclosure. Although shown separately, one of ordinary skill in the art will appreciate that the push server 105, content server 106, and application device 107 may be combined. Further, here the push server 105, content server 106, and application device 107 are generally shown, and it will be understood that they may each contain memory storing computer executable instructions to cause a processor to perform steps described herein and/or memory for storing data, which may include security system access information, restrictions, and access logs as a result of performing steps described herein.

An example premises 102a, such as a home or an automobile, may include device 110. The device 110 may include any communication circuitry needed to allow a device to communicate on one or more links 101 with other devices in the network. For example, the device 110 may include a gateway interface device 111 (e.g., modem), which may include transmitters and receivers used to communicate on the links 101 and with the local office 103. The gateway interface device 111 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one gateway interface device 111 is shown in FIG. 1, a plurality of modems operating in parallel may be implemented within the gateway interface device 111. Further, the gateway interface device 111 may include a device database 120. The gateway interface device 111 may be connected to, or be a part of, the device 110. The device 110 may be one or more computing devices that communicate with the gateway interface device(s) 111 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may be a roving internet connection manager or a connection manager. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), home security system (not shown), and any other desired devices. The gateway interface device 111 may stay relative in location to the display devices. The gateway interface device 111 may be located within or as a part of the above mentions display devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, BLUETOOTH interfaces, and others.

Figure 2:
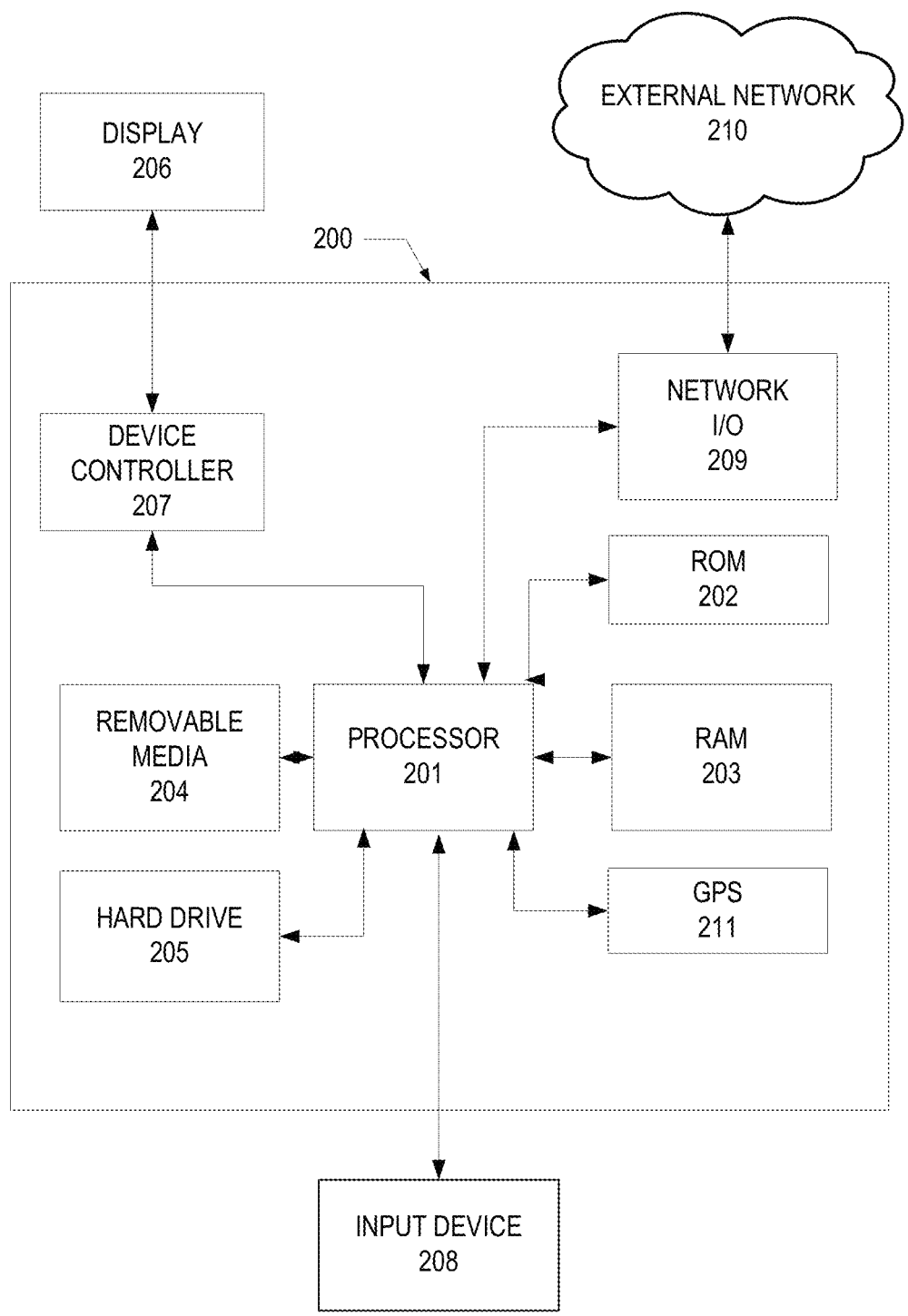
FIG. 2 depicts an example computing device in accordance with aspects of the present disclosure.

Having described an example communication network shown in FIG. 1 in which various features described herein may be implemented, an example computing device as shown in FIG. 2 will be described.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or monitor, or an integrated display), and may include one or more output device controllers 207, such as a video processor. There may also be one or more user input devices 208, such as a remote control, keyboard, mouse, touch screen, microphone, camera for capturing images, video, and the like. One or more input devices 208 may be integrated within the computing device 200. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor on a computer or other data processing device. The computer executable instructions may be stored on one or more computer-readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
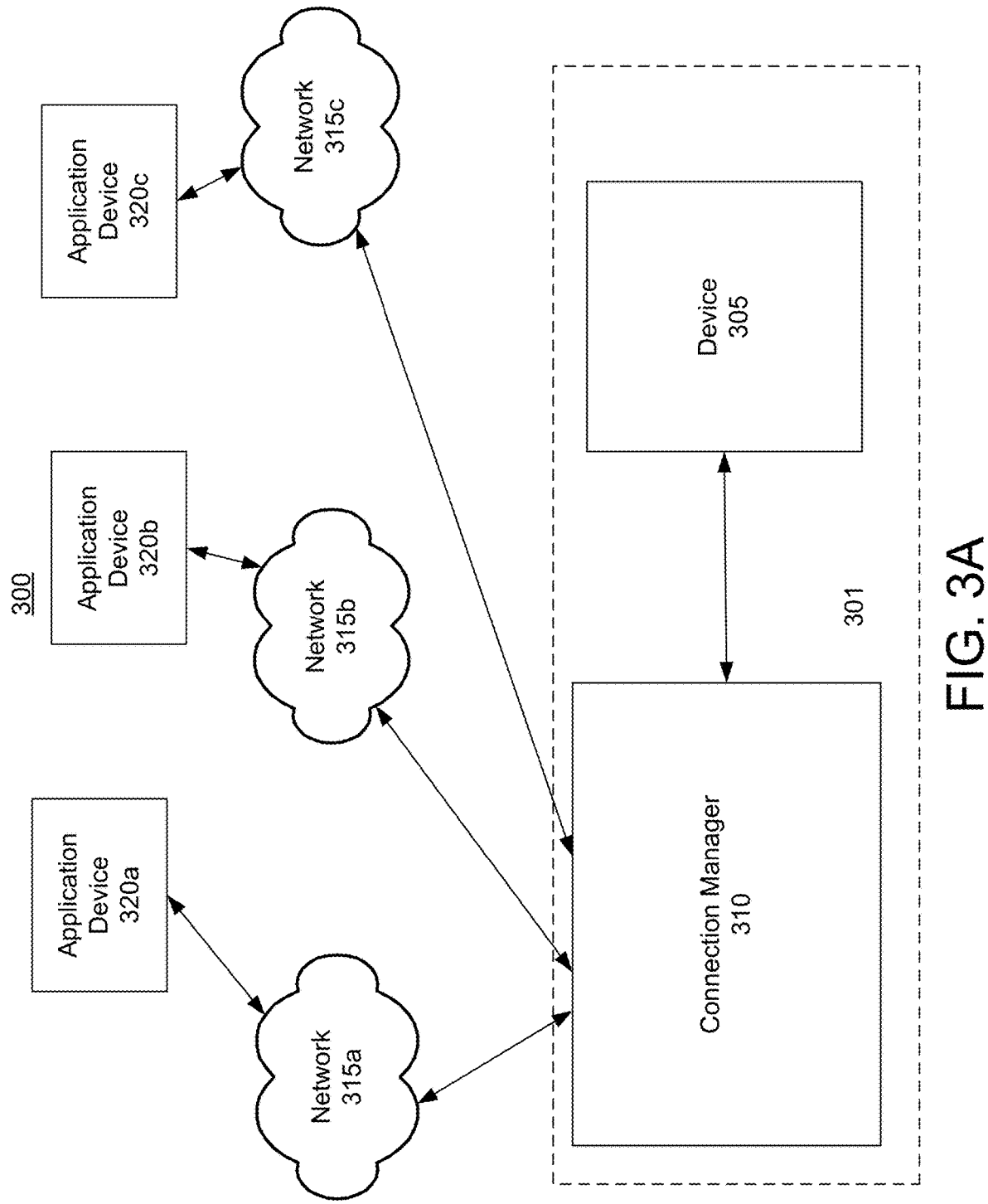
FIG. 3A depicts an example operating network in accordance with aspects of the present disclosure.

FIG. 3A depicts an illustrative diagram of components that may be used according to one or more aspects of the present disclosure. Aspects of the present disclosure may include a connection manager that may monitor a prioritized list of potential internet connections based on preferences and may create a consistent Wi-Fi or BLUETOOTH-based access point for devices to connect to. A connection manager (e.g., connection manager 310) may be connected to device 305 and various networks, such as a wide area network (WAN) (e.g., the Internet), a local area network (LAN) external network 109 (shown in FIG. 1), network(s) 315, application device(s) 320, content server, push server, a cloud, a wireless/cellular network (e.g., 3G network, 4G network, LTE network, etc.), and/or other networks. The specific connection may be via coaxial cable, optical cable, satellite, cellular wireless, 3G, 4G, LTE, WiMAX, Wi-Fi, BLUETOOTH, and/or another type of connection.

Connection manager 310 may be any type of computing device capable of performing the functions described herein, such as previously-described computing device 200, as seen in FIG. 2. Device 305 may include a cable modem (CM), a broadcasting station, a mobile phone or other mobile device, a tablet, a laptop, a standalone PC, a rack-mounted server, a set-top box, etc. The network(s) 315 may include any number of other computing devices. In some aspects, network(s) 315 may be a part of or include a cloud. The network(s) 315 may be an application or application software. The network(s) 315 may be private access, public access, or hybrid access wireless network. The network(s) 315 may include computer services such as computation or data storage to multiple offsite locations available on the internet. In some embodiments, application device(s) 320 may include one or more of the elements described above with respect to the network(s) 315. In some examples, network(s) 315 or application device(s) 320 may act as a server connection to a wireless network. In some aspects, network(s) 315 or application device(s) 320 may offer games, information, and/or data. In some embodiments, network(s) 315 or application device(s) 320 may be a network device (e.g., a head end).

In some embodiments, device 305 may be connected to connection manager 310. As illustrated in FIG. 3A, this connection may form device network 301. The connection manager 310 and device 305 may be located at a same premise or nearby each other. In some aspects, connection manager 310 may communicate with device 305 via LAN connection, Wi-Fi, USB, BLUETOOTH, wireless communication technology, and/or another connection type. In some embodiments, there may be one or more device networks 301 that may each include a connection manager 310 and a device 305. Connection manager 310 may send/receive information or data (e.g., packets) from the device 305.

Connection manager 310 may also be connected to one or more networks (e.g., network 315a, network 315b, network 315c, and/or one or more additional networks). Connection manager 310 may also send/receive information or data (e.g., packets) from networks 315 and application devices 320. In some aspects, connection manager 310 may communicate with one or more networks via LAN connection, Wi-Fi, USB, BLUETOOTH, wireless communication technology, and/or another connection type. Connection manager 310 may act as an intermediary between the device 305 and the networks 315 (which may be connected to one or more application devices 320) for facilitating information transfer between them. In some examples, connection manager 310 may select a preferred connection for transmitting received packets from the device 305 to networks 315a-c or application devices 320a-c.

In some embodiments, the determination of preferences or rules that decide how to implement preference may be received by the connection manager 310 from device 305, for example, via a configuration file or parameter setting. In some instances, the preferences may come from a head end or service provider. In some aspect, the preferences may be based on user preferences. User preferences may be based on a device type of device 305 (e.g., mobile device, laptop, tablet, etc.). Other user preferences may be based on, for example, time of day that information may be transmitted by device 305 (e.g., morning, afternoon, night), time of the week that information may be transmitted by device 305 (e.g., weekday or weekend), time of the month that information may be transmitted by device 305 (e.g., beginning or end), type of information that may be transmitted by device 305 (e.g., an email to a colleague or supervisor, or a link to video to a friend, etc.), size of information (e.g., size of file) that may be transmitted by device 305 and the like.

For example, a preference may define that data should be transmitted over a network of a first type (e.g., network 315a) during the hours 9:00 AM to 5:00 PM, and data should be transmitted over a network of a second type (e.g., network 315b) during other hours. In another example, a preference may define a network that should be used based on a type of data that is being sent. For example, the preference may define that streaming music data should be sent over a first type of connection (e.g., network 315a), while email data should be sent over a second type of connection (e.g., network 315c). In another embodiment, a preference may define connection parameters based on information contained within packets being sent. For example, a preference may define that if an email is being sent to a business contact, the email should be sent over a first connection or type of connection, while if an email is being sent to a personal contact, the email should be sent over a second connection or type of connection. The email preference may, for example, define a contact type, or an individual contact.

In some aspects, a preference may define connection preferences so as to assist in managing cost, usage, or some other factor. For example, a user may have a limited amount of data available in a monthly data plan. A preference may define that data should only be sent using a connection associated with the monthly data plan if there is still data available. For example, if a user has a plan that includes 10 gigabytes of data a month, the connection manager may track the amount of data used so far in the month, the amount of data remaining in the plan, and manage the data transmitted using a connection associated with the data plan so as to avoid going over the monthly limit. In some embodiments, the connection manager 310 may prioritize certain types of data, and only transmit certain types of data using the connection associated with the monthly service plan. For example, the connection manager 310 may prioritize business email, and send the business email using the connection associated with the monthly data plan, while the connection manager 310 may transmit non-business email using a different connection.

In some embodiments, a connection manager 310 may receive, create, and/or maintain a database of one or more user profiles. Each user profile may be related to one or more devices 305, and each user profile may have different preferences for the related devices 305. For example, a single user may have different preferences, depending on what device the user is using, what networks are available, the geographic location of the connection manager 310, etc. One or more preferences may be based on a predefined set of preferences for a particular device.

As another example of preferences, the connection manager 310 may transmit information to (or receive information from) device 305, networks 315, or application devices 320 based on connection cost, technology preference, connection speed, security, preferred provider, one or more other factors, or any combination of these factors. For example, connection manager 310 may receive information from device 305 and transmit that information to network 315a based on connection cost. Connection cost may be in terms of cost limits. For example, a preference may be for the connection manager 310 to transmit information to network 315a, which may utilize a connection with a monthly cap (e.g., 20 Mbytes/month), instead of the network 315b, which may utilize a connection with a different monthly cap (e.g., 500 Mbytes/month).

In another example, the connection chosen by the connection manager 310 may be based on technology preference. A technology preference may include a preference for a connection type of a wireless connection (e.g., LTE network, 3G network, 4G network, etc.). For example, connection manager 310 may receive information from device 305 and transmit the information to network 315a (e.g., an LTE network), instead of network 315b (e.g., a 3G network) or network 315c (e.g., a 4G network). In some embodiments, the preference used to transmit information received from device 305 at connection manager 310 to a network 315 may be based on speed (e.g., bandwidth). For example, connection manager 310 may transmit information based on a user's preference to use the network 315 with the highest bandwidth (e.g., connection manager 310 may choose to transmit the information to network 315b (which may communicate at e.g., 200 kbits/second), instead of network 315a (which may communicate at e.g., 50 kbits/second) or network 315c (which may communicate at e.g., 100 kbits/second)). In some aspects, connection manager 310 may choose to transmit the information to a network 315 based on security (e.g., connection manager 310 may choose to transmit information to network 315c, which may be a private network, instead of networks 315a or 315b, which both may be public networks). In another example connection manager 310 may choose to transmit information over a network that uses Wi-Fi Protected Access (WPA) encryption instead of a network that uses Wired Equivalent Privacy (WEP) encryption. In some examples, connection manager 310 may send information received from device 305 to a particular network 315 based on a preferred provider (e.g., connection manager 310 may choose to send the received information from device 305 to network 315a, which may correlate to a cable provider, instead of network 315b or network 315c, which both may correlate to cellular providers). In some embodiments, connection manager 310 may send information for device 305 to a particular network 315 based on a combination of the preferences described above. For example, the connection manager 310, based on a combination of preferences, may send information for device 305 to network 315a, which may have the connection characteristics of: LTE (e.g., network limited to 500 kbits/second and 1000 Mbytes/month); instead of network 315b, which may have the connection characteristics of: 3G (e.g., network limited to 50 kbits/second and 20 Mbytes/month); or network 315c, which may have the connection characteristics of: 4G (e.g., network limited to 200 kbits/second and 500 Mbytes/month).

In some examples, the connections managed/monitored by the connection manager 310 with the networks 315a-c or application devices 320a-c may be concurrent or may be erratic connections. For example, the connection manager 310 may maintain a table of one or more active connections. In some embodiments, the connection manager 310 may monitor and/or analyze the connection(s) with networks 315a-c and/or device 305 using deep packet inspection (e.g., complete packet inspection and information extraction (IX)). Deep packet inspection may be a form of packet filtering that examines the data part and/or the header of a packet as the packet passes through an inspection point. The packet at the inspection point may be filtered for protocol non-compliance, viruses, spam, malware, intrusions, or certain criteria that may help to decide if the packet should be passed on or if the packet should be routed to a different destination. For example, the connection manager 310 may implement deep packet inspection on packets being passed from the device 305 to the connection manager 310, and packets being passed from the networks 315 or application devices 320 to the connection manager 310. From the connection manager 310 implementing deep packet inspection, the connection manager 310 may obtain information about the characteristics of the packet, and the information the packet contains (e.g., the protocol used for passing the packet, and that the packet contains email information). In some embodiments, the connection manager 310 may use deep packet inspection to determine if packets passed to and from the connection manager 310 are being dropped (e.g., erratic behavior).

If the connection manager 310 identifies erratic behavior in, or disconnection of, a connection between the device 305 and one or more of application devices 320a-c, then the connection manager 310 may act as a proxy on behalf of the one or more of the application devices 320a-c to perform a "keep-alive" function for the connection. If the connection manager 310 identifies erratic behavior in, or disconnection of, a connection between the device 305 and one or more of networks 315a-c, then the connection manager 310 may act as a proxy on behalf of the one or more of the networks 315a-c to perform a "keep-alive" function between connection manager 310 and the one or more of the networks 315a-c.

In some aspects, the "keep-alive" function may be referred to when the connection manager 310 mimics the networks 315/application devices 320 or mimics the device 305 in order to keep alive a connection between the connection manager 310 and the networks 315/application devices 320 or the connection manager 310 and the device 305. The "keep-alive" function may refer to the signal that device 305 sends to the network (e.g., via the connection manager 310) to see if the connection is still alive.

The "keep-alive" function may check for a "pulse" to determine if a connection is still active—hence, the "keep-alive" function is sometimes referred to as a heartbeat. For example, device 305 may send a message to the network 315, asking the network 315 if the connection is active. The network 315 may send an acknowledgment back to confirm that the connection is active. If the network does not respond fast enough, the device 305 may determine that the connection is lost, which may cause an application attempting to communicate over that connection to crash, change state, lose data, or otherwise act in an undesired manner.

To prevent the application from acting in an undesired manner, the connection manager 310 may generate and send a response (e.g., using the "keep-alive" function) to the heartbeat ping—e.g., a keep alive message—which may trick the device 305 into thinking that there is an active network connection, and all is well, even if that is not the case. For example, the connection manager 310 may monitor regular keep-alive requests for a connection to a network. The connection manager 310 may store one or more copies of a response to a keep-alive request, and may identify that stored response as coming from a particular network. Then, if the connection to that network is lost or has connection issues (e.g., the connection experiences erratic behavior), the connection manager 310 may reference the stored response to generate a duplicate or mimicked response to send to device 305 in response to a keep-alive request. Thus, by creating a response based on an actual response, the connection manager 310 may cause the device to believe that a connection has been maintained or is currently active with a particular network. The connection manager may, when creating a mimicked response, include updated information (e.g., timestamp, etc.) relevant to the keep-alive request being responded to. In some embodiments, the connection manager 310 may store a table or database with information about different sample keep-alive requests or responses. Thus, in some embodiments, the connection manager 310 may refer to the table or database storing sample keep-alive requests or responses to determine how to construct the mimicked response. This "keep-alive" function may result in the ability to keep applications running on device 305 from disconnecting, changing state, losing data, etc.

In some examples, the erratic behavior that connection manager 310 identifies may include delays, timeout, noise, noise burst, and/or any other disruption in the connection that may be connecting the device 305 to the connection manager 310 or connecting an application device 320 or network 315 to the connection manager 310. In some embodiments, the connection manager 310 may use deep packet inspection to identify erratic behavior or loss of connection or quality in the connection. For example, the connection manager 310 may packet filter (e.g., filter the information received from device 305 that may be sent to a network 315) at the application level of the open system interconnection (OSI) reference model, illustrated in FIG. 3B. Once the packet is filtered, the connection manager 310 may use the data acquired from filtering the packet to determine if there is erratic behavior.

Figure 3B:
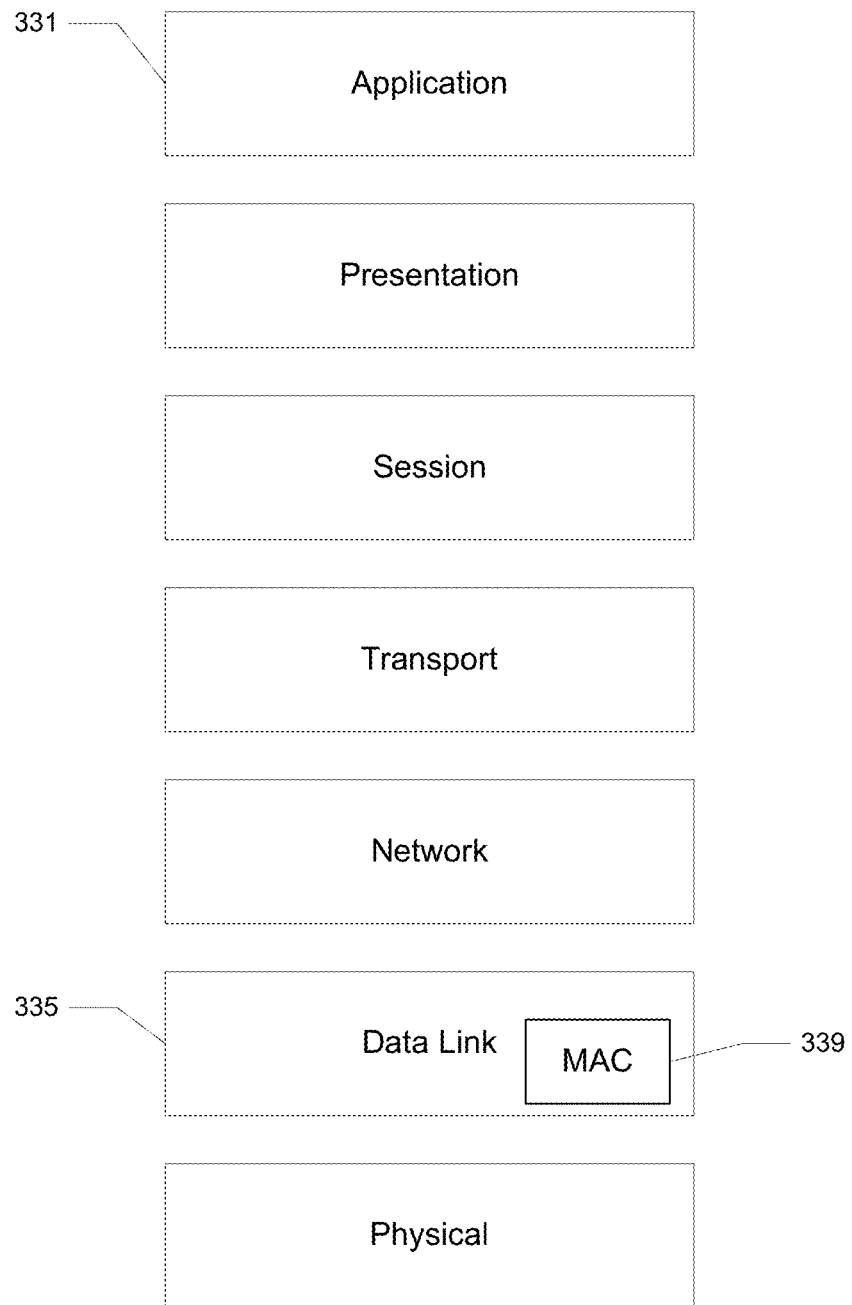
FIG. 3B depicts example information in accordance with aspects of the present disclosure.

In some aspects, the keep-alive function may be performed at the application level of the OSI reference model, illustrated in FIG. 3B. The keep-alive function may be a hypertext transfer protocol (HTTP) keep-alive heartbeat (e.g., a four second heartbeat).

In some aspects, the keep-alive function may be performed at the data link layer (DLL) of the OSI reference model. The DLL may include a media access control (MAC) sublayer. Under this example, the keep-alive function may be a transmission control protocol (TCP) keep-alive message, which may include timing, frame, response, or other characteristics. For example, the TCP keep-alive communications may be structured as a 60 Byte frame, 54 Byte response.

In some embodiments, the connection manager 310 may act as a proxy on behalf of the application device 320 or network 315 to perform the "keep-alive" function with the device 305 at one or more levels. For example, the keep-alive function may be performed at a primary level and a secondary level. In one example, the primary level may be the application level (e.g., HTTP keep-alive 4 second heart beat), and the secondary level may be the MAC level (e.g., TCP keep-alive: 60 Byte Frame, 54 Byte Response).

As illustrated in FIGS. 3C and 3D, in some aspects, the connection manager 310 may connect to one or more of networks 315a-c based on a geographic location of the connection manager 310 and/or the device network 301. For example, if the connection manager 310 is moving (e.g., the connection manager is in a plane, train, automobile, boat, vehicle, etc.), the connection manager 310 may dynamically readjust connections to network 315 based on a moving endpoint of connection manager 310 or device network 301. The connection manager 310 may keep open multiple connections as the connection manager 310 and/or device network 301 moves through different geographic locations, and open new connections as they become available. The connection manager 310 may drop connections that cannot be opened or utilized as the connection manager 310 and/or device network 301 geographically changes location. In some examples, the connection manager 310 selects different networks 315 and/or modulation schemes based on different geographic endpoints of the connection manager 310 and/or the device network 301.

In some aspects, the connection manager 310 may provide for virtual private network (VPN) tunnels. Private VPN tunnels may allow linking the device 305 to the connection manager 310, and from the connection manager 310 to one or more devices on one or more networks. A private VPN tunnel may allow for the connection manager 310 to send and receive information from device 305 on an encrypted or secure basis. Using a VPN tunnel may help to strengthen the connection between the connection manager 310 and the device 305 as the connection manager 310 changes, manages, and sends information over various connections between the connection manager 310 the various networks 315. Connection manager 310 may maintain one or more VPN tunnels for a particular device, or allow multiple devices to communicate using the same VPN tunnel. Connection manager 310 may establish a VPN tunnel over multiple networks 315, which may allow for a more constant connection between device 305 and a destination of the VPN tunnel. Connection manager 310 may establish parallel VPN tunnels to the same destination over different networks 315, so that if one or more of networks 315 has a connection problem or failure, device 305 may still be connected to the destination of the VPN tunnel via one of the other networks 315. If connection manager 310 has a VPN tunnel established, and connects to a new or different network, connection manager 310 may automatically establish a parallel VPN tunnel to the same destination as an existing VPN tunnel over an existing connection, in order to provide a redundant and more reliable connection.

FIG. 3B depicts example information in accordance with aspects of the present disclosure. Example information 311 may illustrate part of an open system interconnection reference model. The OSI reference model typically includes seven layers (e.g., application layer, presentation layer, session layer, transport layer, network layer, data link layer, and physical layer) that may characterize and standardize the communication functions of a telecommunication or computing system without illustrating their underlying internal structure and technology. The connection manager 310 may utilize one or more layers of the OSI reference model (e.g., the application layer 331, the data link layer 335). The data link layer may include the media access control (MAC) layer 339. For example, the data communication protocol used by the connection manager 310 may be established at the MAC layer 339.

The application layer 331 may be considered the primary layer used by the connection manager 310 when executing the "keep-alive" function. The connection manager 310 at the primary level (e.g., application layer 331) may enable a HTTP keep-alive 4 second heartbeat. The data link layer 335 may be considered the secondary level used by the connection manager 310 when executing the "keep-alive" function. The connection manager 310 at the secondary level (e.g., data link layer 335), which may include a MAC layer 339, may enable a TCP keep-alive transmission (e.g., Timing (e.g., 1 millisecond (ms), 2 ms, 3 ms, 4 ms, 1 second (sec), 2 sec, 3 sec, 4 sec, 1 minute (min), 2 min, 3 min, 4 min, 1 hour, 3 hours, 1 day, 1 month, and the like), 60 Byte Frame, 54 Byte Response). In some embodiments, the TCP keep-alive message may be constructed from a number of different characteristics or variations of timing, byte frame, or byte response.

FIGS. 3C and 3D depict an example operating network in accordance with aspects of the present disclosure. FIGS. 3C and 3D may illustrate a vehicle 340 traveling through networks 315 at a first point in time and at a second point in time. The device network 301 or connection manager 310 may be located inside vehicle 340. FIG. 3C may illustrate the vehicle 340 at a first point in time. FIG. 3D may illustrate the vehicle 340 at a second point in time. In FIGS. 3C and 3D, the size of each network 315a-c may be representative of the limits of the range of each network 315a-c.

In the depicted example, the location of vehicle 340 (inside of which may be connection manager 310) may affect the ability of connection manager 310 to connect and transmit or receive information from networks 315a and 315b. Connection manager 310, as shown in FIG. 3C, may only be able to connect to network 315c, because connection manager 310 is within the range of only network 315c. As the vehicle 340 changes locations, as seen in FIG. 3D, the connection manager 310 may no longer be able to connect to network 315c, but instead may be able to connect to networks 315a and 315b. Thus, as connection manager 310 moves into the range of a particular network (e.g., network 315b and/or network 315c), connection manager 310 may connect to the particular network. Similarly, as connection manager 310 moves out of range of a particular network, connection manager 310 may disconnect from that network. The connection manager 310 may use the above discussed preferences to determine what network (e.g., network 315a or network 315b or both) to connect with and/or transmit data over.

In some aspects, if the connection manager 310 is located within range of one or more networks 315, the connection manager 310 may open connections with one available network 315, every available network 315, or a subset of every available network 315. Alternatively, connection manager 310 might not connect to any available network (e.g., if no available network meets the connection preferences governing connection manager 310). The connection manager 310 may monitor its connection with each network and determine, optionally using the preferences, what network to use to send the information received from device 305. In some aspects, the connection manager 310 may choose a particular network to use for sending the received information from device 305. In some aspects, connection manager 310 may transmit data from device 305 using one network (e.g., network 315a), and receive data for device 305 using a different network (e.g., network 315b). If connection manager 310 is connected to a network 315, the connection manager 310 may monitor that network (e.g., network 315a) for erratic behavior or quality of connection (e.g., poor signal or lost signal). If the connection manager 310 determines that erratic behavior or poor signal quality exists, the connection manager 310 may mimic functions of the connected network 315 (e.g., network 315a) in order for the device 305 to believe that a connection is being maintained by the connection manager 310 with the selected network (e.g., network 315a), so that device 305 may still be able to send and receive information from the selected network (e.g., network 315a) (e.g., the "keep-alive" function), maintain a desired application state, avoid a crash, avoid data loss, or the like.

In some embodiments, if the connection manager 310 moves to a new geographic location, the connection manager 310 may open one or more new connections to one or more newly available networks 315. For example, as illustrated in FIG. 3D, vehicle 340 is in a different location than in FIG. 3C, and in the range of different networks (e.g., network 315a and network 315b, instead of network 315c). In some instances, as the connection manager 310 moves to a new geographic location, connection manager 310 may terminate or end connection(s) with certain networks. The connection manager 310 may terminate connections, for example, because a network's connection quality may be below a particular threshold, the connection may have been lost, or the network may be out of range of the connection manager 310. For example, as depicted in FIG. 3D, device network 301 or connection manager 310 may be geographically located where connection manager 310 may be only able to connect with network 315a or 315b. At a different time, the connection manager 310 may geographically move to be in the range of network 315c (not shown). When the device network 301 and/or connection manager 310 moves to this new geographic location, it may be out of reach and unable to connect to network 315a. The connection manager 310 may then end or terminate its connection to network 315a based on the new geographic location. In some instances, the connection manager 310 may also keep open connections to network(s) 315a and 315b using the keep-alive function, for a period of time. For example, if connection manager 310 loses connection to network 315b, connection manager 310 may perform a keep-alive function to keep the device 305 from responding to a loss of connection. Connection manager 310 may, based on one or more factors (e.g., a threshold period of time, threshold number of reconnection attempts, threshold number of dropped packets, etc.), terminate a connection to network 315b. In some aspects, if connection manager 310 terminates a connection to a network (e.g., network 315b), connection manager may stop performing a keep-alive function for one or more connections to that network (e.g., network 315b).

Figure 4:
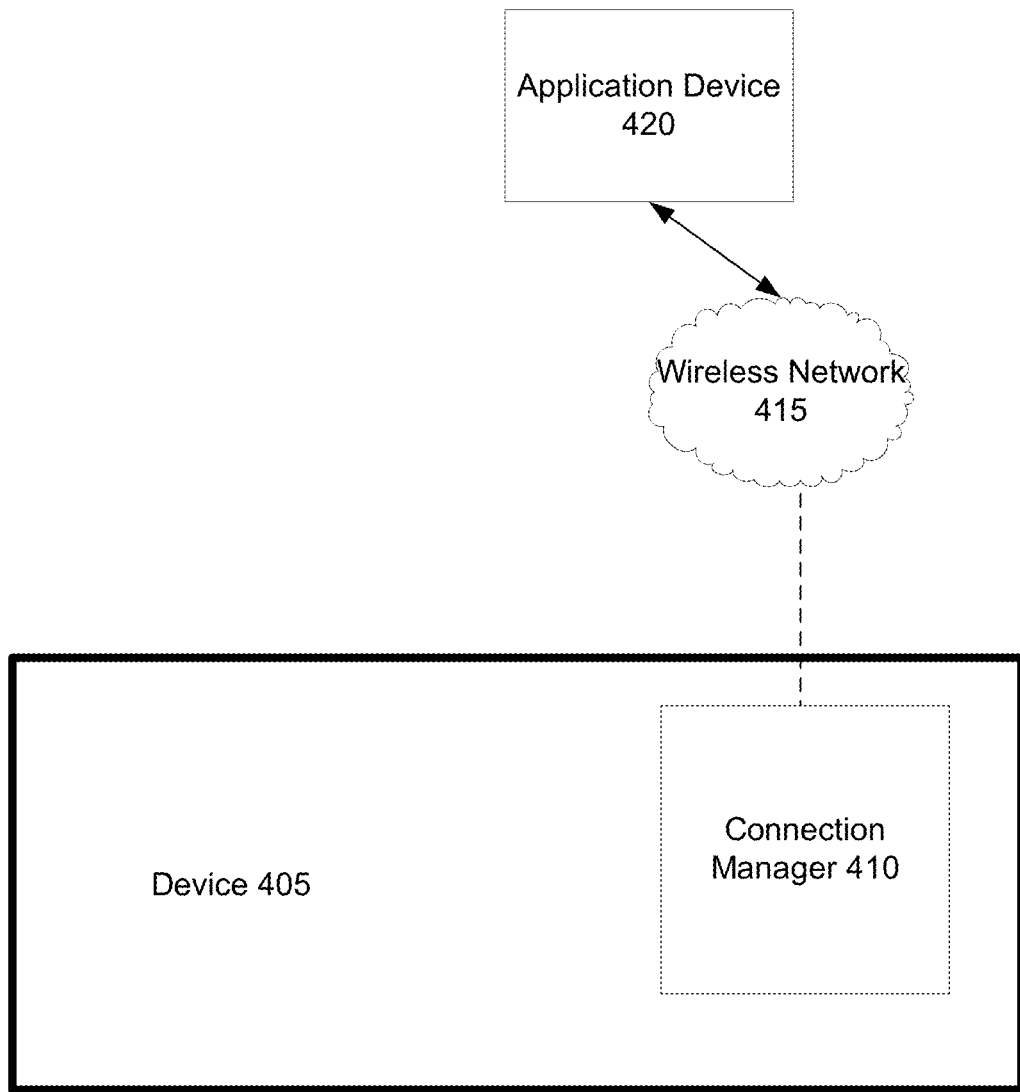
FIG. 4 depicts an example operating network in accordance with aspects of the present disclosure.

FIG. 4 illustrates one example of a device 405 (e.g., user device, cell phone, tablet, laptop, etc.) that may be used to implement one or more features described herein. Device 405 may be similar to and share the similar features of previously described device 200, as seen in FIG. 2. In some embodiments, connection manager 410 and device 405 may be a single device. For example, the connection manager 410 may be built into a device 405 (e.g., built into a mobile phone), instead of being built into a router, a MiFi, hotspot, or acting as its own standalone device. While some features of the connection manager 410 may be similar to features of connection manager 310, some features of connection manager 410 may be different, based on connection manager 410 being built into device 405. For example, connection manager 410 may operate as software on the device 405. As a further example, connection manager 410 may be one or more standalone chips or modules connected via hardware or software to one or more other elements of device 405. As another example, connection manager 410 may be a standalone application, downloadable from an application store, may be a part of an operating system of device 405, may be an application plugin, or the like. Connection manager 410 may control one or more connections of device 405 to one or more networks or application servers (e.g., network 415 or application device 420). In other words, in an embodiment where connection manager 410 is a part of device 405, there might not be a network connection (e.g., Wi-Fi, BLUETOOTH, Ethernet, etc.) between device 405 and connection manager 410, but there may be an internal hardware and/or software connection between connection manager 410 and one or more other components of device 405. There may be one or more connections between device 405 and one or more networks 415, which may be managed by connection manager 410. The connection manager 410 may cause device 405 to believe device 405 is connected to a network 415 when there is erratic behavior by mimicking behavior of a connected network (e.g., buffering information received from the network 415 and/or responding to keep-alive messages on behalf of network 415). In some embodiments, the connection manager 410 may allow the device 405 to maintain a quality connection to a network 415 or application device 420.

Figure 5A:
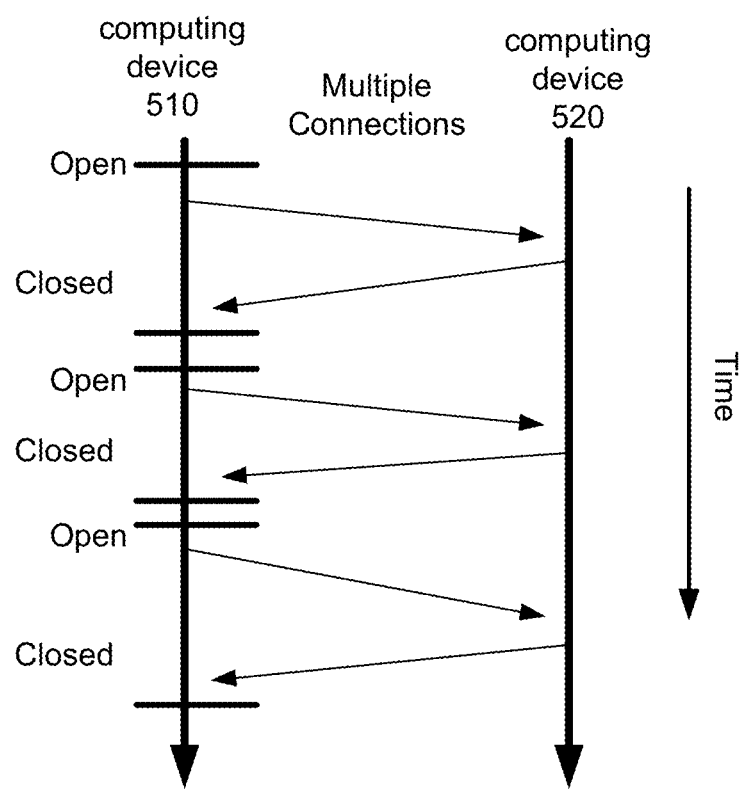
FIGS. 5A and 5B depict an illustrative diagram of connections between a computing device and another computing device in accordance with aspects of the present disclosure.
Figure 5B:
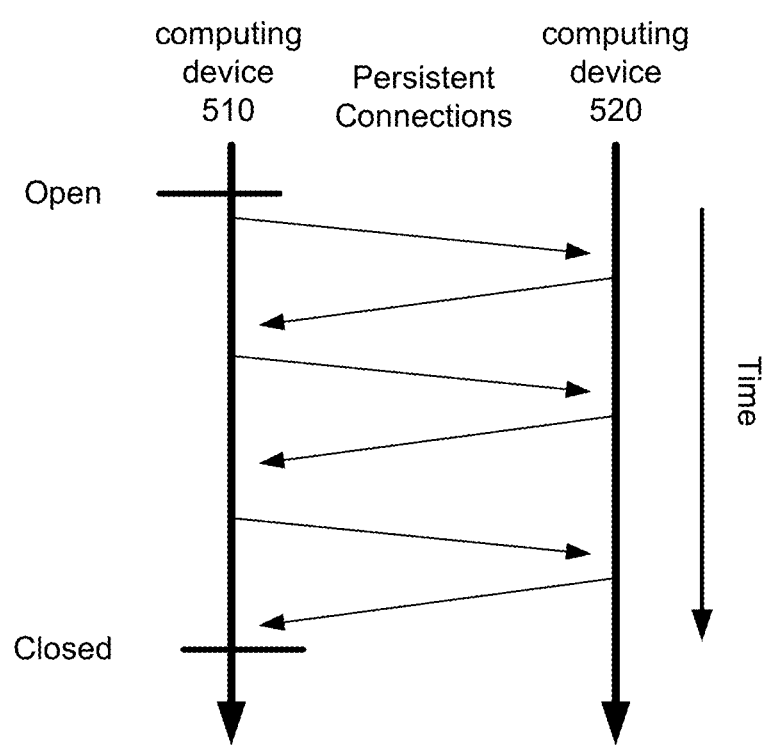

FIGS. 5A and 5B depict an illustrative diagram of how the devices described herein may operate according to one or more aspects of the present disclosure.

FIG. 5A illustrates communications between a computing device 510 and computing device 520, which may take place over a series of discrete connections or communications. For example, computing device 510 may be similar to device 305. In some embodiments, there may be multiple connections between computing device 510 and computing device 520. For example, multiple connections may be due to attempts to optimize connections, due to preferences, and/or due to erratic behavior in the connection and/or connection loss. For example, the erratic behavior or connection loss may result in the computing device 510 having to continuously open and close its connection with computing device 520 every time computing device 510 needs to send information to computing device 520.

FIG. 5B illustrates communications between computing devices 510 and 520, which may take place over a persistent connection. For example, computing device 510 may include or be in communication with a connection manager (e.g., a connection manager may be integrated into computing device 510, or communications from computing device 510 may go to computing device 520 via a connection manager). In some embodiments, computing device 510 may mimic the wireless network or a device and maintain an open connection if erratic behavior occurs. The computing device 510 may implement a "keep-alive" function until the erratic behavior has ended. As a result of the computing device 510 implementing the "keep-alive" function, a persistent connection may be maintained. This may allow for a connection between computing device 510 and computing device 520 to be opened and closed less frequently as compared to the embodiment described previously with regards to FIG. 5A.

Figure 6:
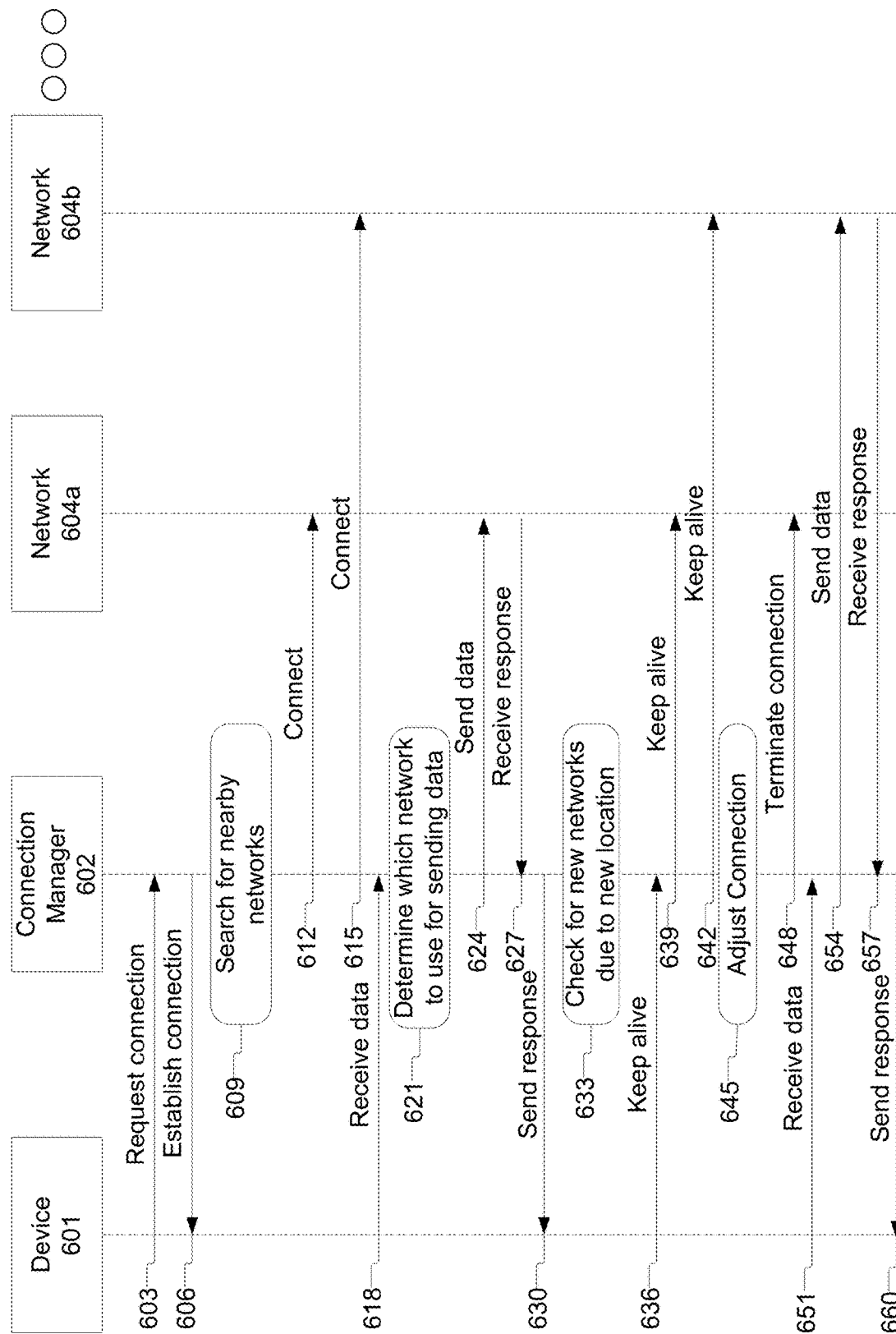
FIG. 6 depicts an example process flow of an example process in accordance with aspects of the present disclosure.

FIG. 6 depicts a process flow illustrating a method for managing a wireless connection between a connection manager and network, according to one or more aspects described herein.

At step 603, the device 601 may request to connect to a network or an application device 601. For example, a user may request for a mobile phone (e.g., a device 601) to connect to a cloud (e.g., network 604a or network 604b). The connection manager 602 may receive the request from the device 601.

At step 606, the connection manager 602 may establish a connection with the device 601. For example, the connection manager 602 may establish the connection based on the request. In some embodiments, the connection manager 602 may establish a VPN tunnel between the connection manager 602 and the device 601.

At step 609, the connection manager 602 may search for nearby networks to connect to for sending the information received from the device 601. The networks may be within a certain range of the connection manager 602. Whether or not a network is discovered by the connection manager 602 may depend on one or more factors (e.g., the range or characteristics of the networks, each network's broadcast characteristics, etc.). Once the networks have been identified (e.g., network 604a and network 604b), the method may continue to steps 612 and 615. In some embodiments, the connection manager 602 may search for nearby networks periodically or based on a predetermined timing arrangement (e.g., every 5 seconds, every 15 seconds, every minute, every time a connection is lost, etc.).

At steps 612 and 615, the connection manager 602 may connect to one or more of the identified networks. For example, at step 612, the connection manager 602 may connect to network 604a, and at step 615, the connection manager 602 may connect to network 604b.

At step 618, the connection manager 602 may receive information (e.g., data, packets, or the like) from a device 601 that may need to be transmitted to a network. After the connection manager 602 receives the data from the device 601, the method may proceed to step 621.

At step 621, the connection manager 602 may determine what network to use for sending the data. The connection manager 602 may use, for example, any of the previously described methods to select a network to connect with (e.g., based on one or more preferences). For example, the connection manager 602 may select network 604a to connect with based on the type of packets being transmitted (e.g., size of packets and the amount of packets) in combination with the connection type (e.g., network 604a may be a LTE network, while network 604b may be a 3G network). In some embodiments, the connection manager 602 may determine the network to transmit the information received from the device 601, based on user preferences of the user controlling device 601. The connection manager 602 may receive a configuration file (e.g., parameter settings) containing user preference for selecting a network. The user preferences may be any of a number of user preferences, such as those described previously. For example, preferences may relate to bandwidth, network security, cost, etc. Under this example embodiment, and for illustrative purposes, network 604a may be selected by the connection manager 602.

At step 624, the connection manager 602 may transmit the information (e.g., data) received at step 618 from the device 601 to network 604a. At step 627, the connection manager 602 may receive information (e.g., receive a response) from network 604a in response to the transmitted information. At step 630, the connection manager 602 may transmit the information received in step 627 in the received response to the device 601.

At step 633, the connection manager 602 may be moved to a new geographic location. The connection manager 602 may determine that the connection manager 602 has moved geographic locations, for example, by periodically checking the GPS coordinates (e.g., latitude and longitude) of the connection manager 602 (e.g., using GPS software or location functionality on the device 601). In response to the connection manager 602 moving geographic locations, the connection manager 602 may search for new nearby networks. Alternatively or additionally, the connection manager 602 may search for new or different networks based on one or more other factors (e.g., a threshold period of time being reached, a network connection being dropped, a network connection experiencing problems, etc.). Based on the search, the connection manager 602 may open new or different network connections, maintain existing network connections, and/or terminate existing network connections.

At step 636, the connection manager 602 may receive a keep-alive request from the device 601. At steps 639 and 642, if, for example, one or more network connections are experiencing connection-quality issues, the connection manager 602 may respond to the keep-alive request to maintain connections with those networks (e.g., network 604a and network 604b). In some embodiments, if the connection manager performs the keep-alive function, then performing the keep-alive function may trigger the connection manager 602 to search for new nearby networks.

At step 645, the connection manager 602, based on actions taken in step 633, may adjust (e.g., disconnect) a connection to a network, and may determine a new or different network for sending data.

At step 648, if the connection manager 602 determines that the connection manager 602 has moved to a location out of the range of network 604a, the connection manager 602 may terminate a connection with network 604a (e.g., as illustrated in FIG. 6). At step 651, the connection manager 602 may receive data from the device 601. At step 654, the connection manager 602 may send data to network 604b (e.g., because network 604a may have been disconnected at step 648, and network 604b's connection may have been maintained by the keep-alive function at step 642).

At step 657, the connection manager 602 may receive a response containing information from network 604b. At step 660, the connection manager 602 may send the information from the received response to the device 601.

Figure 7:
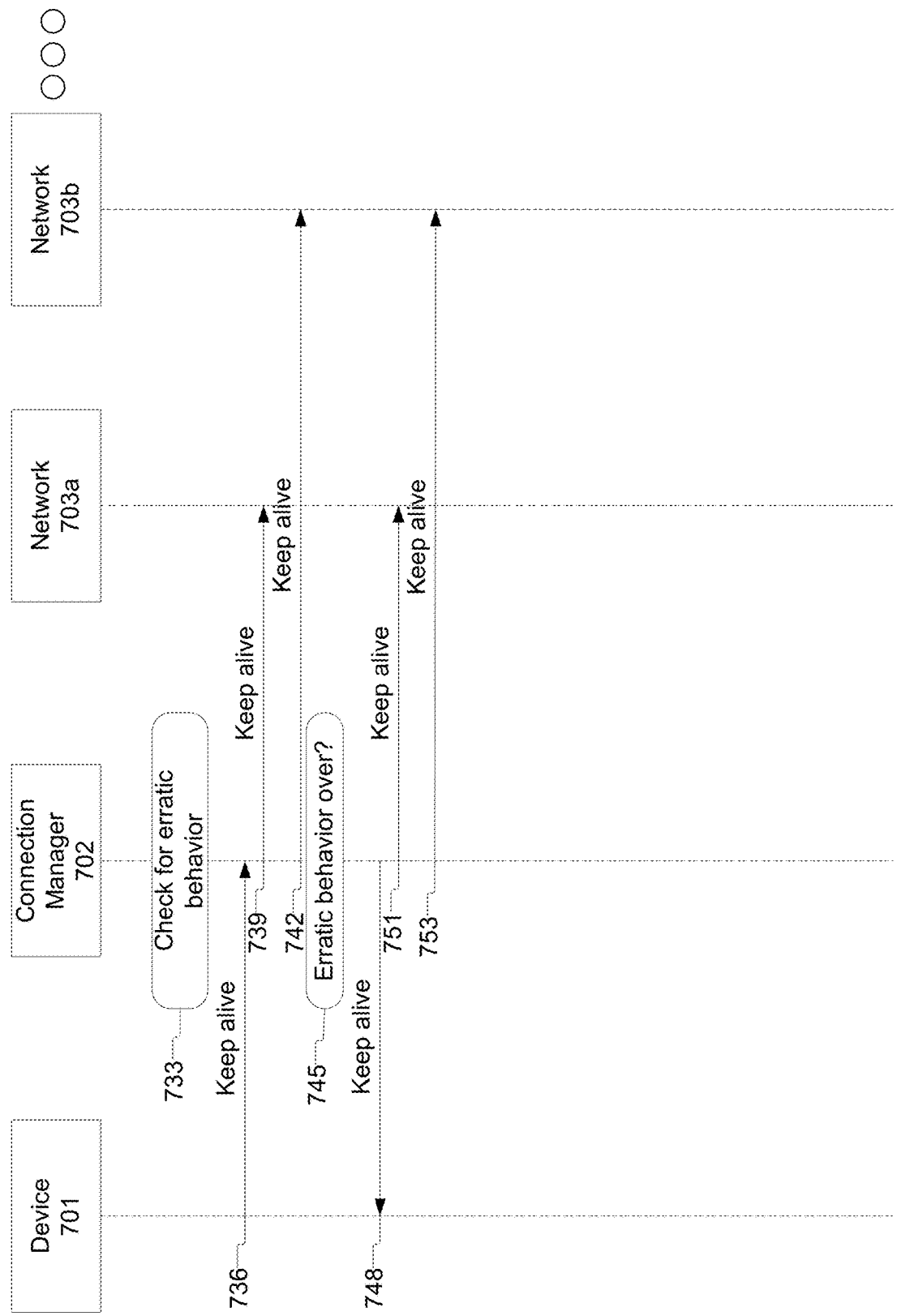
FIG. 7 depicts an example process flow of an example process in accordance with aspects of the present disclosure.

FIG. 7 depicts an example process flow that depicts an illustrative method for managing a wireless connection between a device 701 and connection manager 702, according to one or more aspects described herein. FIG. 7 may depict an illustrative method for detecting erratic behavior among a connection and implementing a keep-alive function.

In addition to performing the steps depicted in FIG. 7, one or more steps similar to one or more of steps 603-630 may be performed before, after, or in between steps depicted in FIG. 7.

At step 733, the connection manager 702 may determine whether there is erratic behavior (e.g., poor connection quality) with a connection between the device 701 and the connection manager 702, and/or the connection manager 702 and one or more of the connected networks (e.g., network 704a and network 704b). The connection manager 702 may manage, analyze, and/or monitor one or more connections (e.g., between the connection manager 702 and the device 701, and/or between the connection manager 702 and one or more networks) in order to determine erratic behavior. Erratic behavior may, for example, relate to the signal strength of the connections, the signal strength being below a predetermined or selected threshold, or the like. In some examples, erratic behavior may include a loss of connection or a loss of connection strength (e.g., a data transfer rate being below a threshold). If the connection manager 702 does not detect erratic behavior, the method may return to step 709, and the connection manager 702 may continue to monitor existing connections and search for new connections. If the connection manager 702 at step 733 determines or identifies erratic behavior, then the method proceeds to step 736.

At step 736, the connection manager 702 may receive a keep-alive request from the device 701. The connection manager 702 may respond to the keep-alive request as described above. For example, the connection manager 702 at step 739 and step 742 may mimic the expected behavior of network 704a or network 704b, depending on which network is demonstrating erratic behavior. By mimicking the expected network behavior, connection manager 702 may keep the device 701 or an application running on the device 701 from determining that network connection quality is poor. After the connection manager 702 implements the keep-alive function, the method may proceed to step 745.

At step 745, the connection manager 702 may continuously or periodically check the connection to determine if the erratic behavior has stopped. If the erratic behavior has not ended, then the method may proceed to one or more of steps 748, 751, and 753, where the connection manager 702 may continue to mimic actions normally taken by the network (e.g., network 704a or network 704b) to the device 701. This may result in the device 701 believing the connection has been maintained. In some embodiments, the connection manager 702 may mimic the networks by buffering information received from the networks and using that buffered information to send to the device 701. And as described above, in some embodiments, the connection manager 702 may respond to the keep-alive request using a similar or identical response to one that would normally come from the network.

In any of the methods, machines, apparatus, devices, and the like described herein, steps may be added, omitted, modified, and/or performed in a different order.

In some embodiments, the connection manager may be referred to as a Roving Internet Connection Manager (RICM). The connection manager may manage a connection between a device and a network, application device, or cloud. In some aspects, cloud, network, application, application device, server, network device, and head-end may be part of one or more interconnected networks, and, therefore, may be referred to interchangeably. In some aspects, a device, mobile computing device, mobile device, user device, end user device, or computing device may be capable of connecting to a network via the connection manager.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in the art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
receiving, by a computing device and from an application device, one or more first messages;
determining, based on the one or more first messages, that a connection quality between a user device and the application device satisfies a threshold;
sending a first indication to the user device that the connection quality satisfies the threshold;
receiving, by the computing device and from the application device, one or more second messages;
determining, based on the one or more second messages, that the connection quality does not satisfy the threshold; and
sending, based on the connection quality not satisfying the threshold, a second indication to the user device that the connection quality satisfies the threshold.

2. The method of claim 1, wherein the sending the second indication to the user device causes the user device to keep a connection between the user device and the application device open.

3. The method of claim 1, further comprising:
determining whether to send information via a first network or a second network based on a user preference that indicates a time of day to send information via the second network.

4. The method of claim 1, comprising:
determining whether to send information via a first network or a second network based on one or more preferences indicating that information to be sent to a first domain is to be sent via the first network and information to be sent to a second domain is to be sent via the second network.

5. The method of claim 1,
wherein the first indication comprises a message created by the application device and the second indication comprises a modified copy, generated by the computing device, of the message.

6. The method of claim 1, wherein the one or more first messages are received via a first connection and a first network, the method further comprising:

determining a geographic location of the computing device; and establishing, based on the geographic location and the connection quality not satisfying the threshold, a second connection via a second network.

7. A method comprising:

receiving, by a computing device and from an application device, one or more first messages;

determining, based on the one or more first messages, that a connection quality between a user device and the application device satisfies a threshold;

sending, a first indication to the user device that the connection quality satisfies the threshold;

determining, based on a data transfer rate between the computing device and the application device, that the connection quality does not satisfy the threshold; and sending, based on the connection quality not satisfying the threshold, a second indication to the user device that the connection quality satisfies the threshold.

8. The method of claim 7, wherein the sending the second indication comprises determining that a threshold quantity of reconnection attempts, by the computing device and to the application device, has not been made.

9. The method of claim 7, further comprising:

based on the determining that the connection quality satisfies the threshold, storing the one or more first messages for use during a future time in which the connection quality does not satisfy the threshold.

10. The method of claim 7, wherein the first indication comprises a message created by the application device, and the second indication comprises a modified copy, generated by the computing device, of the message.

11. A method comprising:

receiving, by a computing device and from an application device, one or more first messages;

determining, based on the one or more first messages, that a connection quality between a user device and the application device satisfies a threshold;

sending a first indication to the user device that the connection quality satisfies the threshold;

determining that the connection quality does not satisfy the threshold; and sending, based on the connection quality not satisfying the threshold, a second indication to the user device that the connection quality satisfies the threshold.

12. The method of claim 11, further comprising:

determining whether to send information via a first network or a second network based on a user preference that indicates a time of day to send information via the second network.

13. The method of claim 11, further comprising:

determining whether to send information via a first network or a second network based on at least one preference that indicates a type of data to send via the second network.

14. The method of claim 1, further comprising:

determining, based on a user preference that indicates an amount of data to send via a first network within a predetermined time frame, whether to send information via the first network or a second network.

15. The method of claim 1, further comprising:

based on the determining that the connection quality satisfies the threshold, storing the one or more first messages; and wherein the sending the second indication comprises:
modifying the stored one or more first messages to create a modified message; and
sending the modified message to the user device.

16. The method of claim 7, further comprising:

determining, based on a user preference that indicates an amount of data to send via a second network within a predetermined time frame, whether to send information via a first network or the second network.

17. The method of claim 7, further comprising:

based on the determining that the connection quality satisfies the threshold, storing the one or more first messages; and wherein the sending the second indication comprises:
modifying the stored one or more first messages to create a modified message; and
sending the modified message to the user device.

18. The method of claim 11, further comprising:

determining, based on a user preference that indicates an amount of data to send via a first network within a predetermined time frame, whether to send information via the first network or a second network.

19. The method of claim 11, further comprising:

based on the determining that the connection quality satisfies the threshold, storing the one or more first messages; and wherein the sending the second indication comprises:
modifying the stored one or more first messages to create a modified message; and
sending the modified message to the user device.

20. The method of claim 1, wherein the determining that the connection quality does not satisfy the threshold comprises determining that a message sent by the application device would be unable to reach the computing device.

21. The method of claim 11, wherein the determining that the connection quality does not satisfy the threshold is based on a signal strength corresponding to a connection between the application device and the computing device.

* * * * *

UNITED STATES PATENT AND TRADEMARK OFFICE
CERTIFICATE OF CORRECTION

| | |
|---|---|
| PATENT NO. | : 11,496,579 B2 |
| APPLICATION NO. | : 15/001033 |
| DATED | : November 8, 2022 |
| INVENTOR(S) | : Grauch |

It is certified that error appears in the above-identified patent and that said Letters Patent is hereby corrected as shown below:

In the Drawings

Sheet 10 of 10, Fig. 7, Reference Numeral 703a, Line 2:
Delete "703a" and insert --704a-- therefor Sheet 10 of 10, Fig. 7, Reference Numeral 703b, Line 2:
Delete "703b" and insert --704b-- therefor Signed and Sealed this
Second Day of January, 2024

Katherine Kelly Vidal
*Director of the United States Patent and Trademark Office*